United States Patent

Heinitz et al.

Patent Number: 6,067,799
Date of Patent: May 30, 2000

[54] METHOD FOR THE CLOSED-LOOP CONTROL OF THE BOOST PRESSURE OF A TURBOCHARGED INTERNAL COMBUSTION ENGINE

[75] Inventors: Dirk Heinitz, Schönhofen; Achim Przymusinski, Regensburg; Christian Birkner, Irlbach, all of Germany

[73] Assignee: Siemens Aktiengesellschaft, Munich, Germany

[21] Appl. No.: 09/220,235

[22] Filed: Dec. 23, 1998

[30] Foreign Application Priority Data

Dec. 23, 1997 [DE] Germany .......................... 197 57 661

[51] Int. Cl.⁷ .................................................. F02D 23/00
[52] U.S. Cl. ................................................................ 60/602
[58] Field of Search ....................................... 60/602, 600

[56] References Cited

FOREIGN PATENT DOCUMENTS

4344960A1  7/1995  Germany .

*Primary Examiner*—Noah P. Kamen
*Attorney, Agent, or Firm*—Herbert L. Lerner; Laurence A. Greenberg; Werner H. Stemer

[57] ABSTRACT

The boost pressure in a turbocharged internal combustion engine is regulated by closed-loop control. A current performance graph value $u(k)$, corresponding to a desired boost pressure, is determined from a speed/load-dependent performance graph. After that, the current performance graph value $u(k)$ is compared with a previous performance graph value $u(k-1)$. If the current performance graph value $u(k)$ is greater than or equal to the previous performance graph value $u(k-1)$, then the current performance graph value $u(k)$ is transmitted as the process parameter $x(k)$. Conversely, if the current performance graph value $u(k)$ is less than the previous performance graph value $u(k-1)$, then the current performance graph value $u(k)$ is filtered by a $PT_2$ member after an idle time elapses and is transmitted as the process parameter $x(k)$.

5 Claims, 1 Drawing Sheet

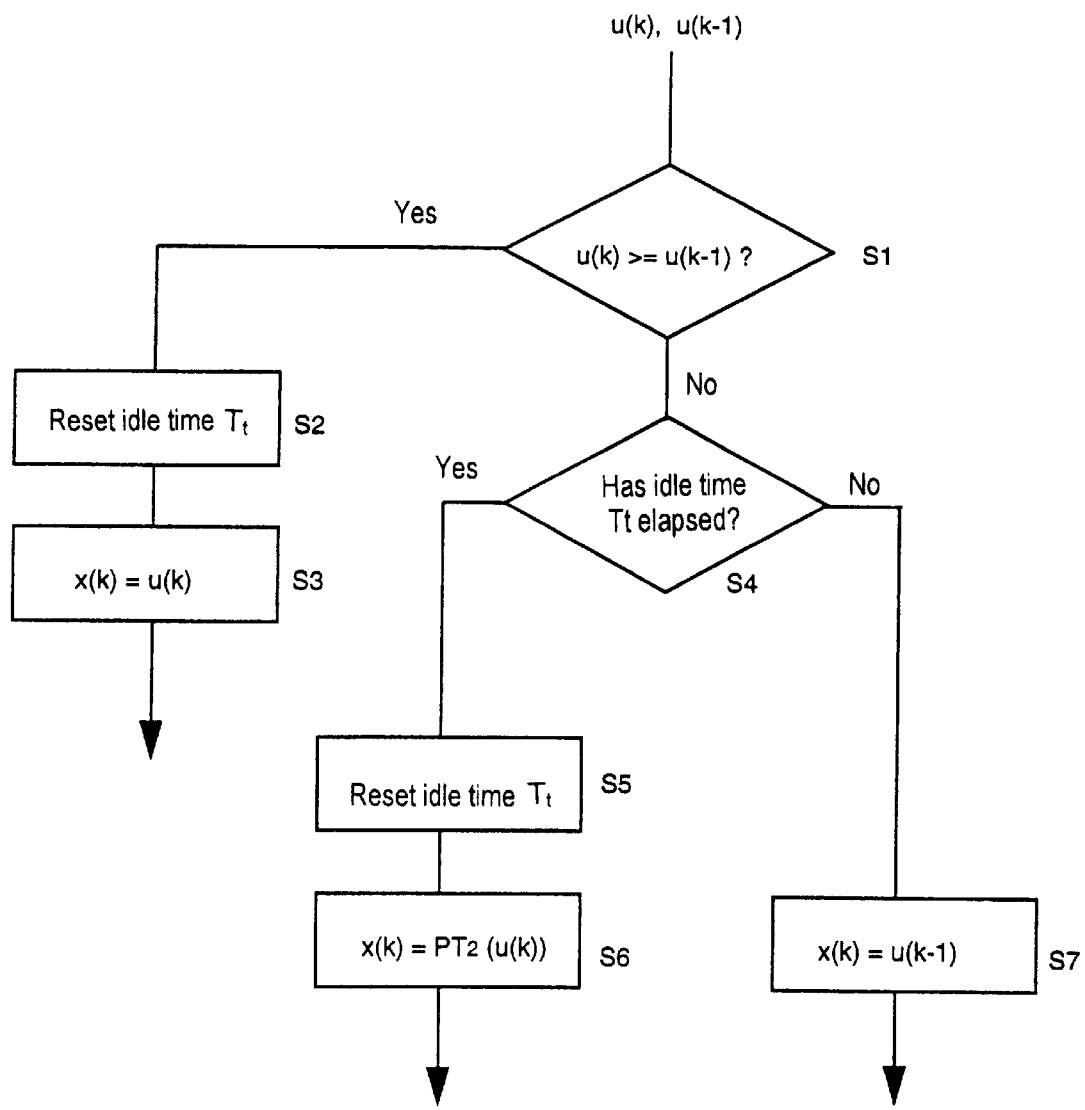

METHOD FOR THE CLOSED-LOOP CONTROL OF THE BOOST PRESSURE OF A TURBOCHARGED INTERNAL COMBUSTION ENGINE

BACKGROUND OF THE INVENTION

Field of the Invention

The invention lies in the automotive arts. Specifically, the invention relates to a method for the closed-loop control of the boost pressure of an internal combustion engine with a turbocharger. In particular, the method is used for transient variation of the desired boost pressure value for internal combustion engines.

In internal combustion engines, especially diesel engines, that are equipped with a turbocharger, it is necessary for combustion-technical reasons to make defined boost pressures for the filling of the combustion chambers available over the entire operating range. The boost pressure generated by the turbocharger is dependent on the operating point of the engine. In a prior art regulating unit that regulates the boost pressure, the desired boost pressure is taken from an rpm and load-dependent performance graph. The desired values stored in the performance graph are ascertained beforehand with the aid of static test bench experimentation. At low engine speeds (rpm) or low loads, low desired boost pressures are stored in memory.

Motor vehicle operation predominantly takes place in dynamic fashion, however, that is, with frequently changing engine speeds and thus different boost pressures. Specifying desired boost pressures from a performance graph, therefore, is not always satisfactory. Under rapid load changes, for instance during shifting, the speed and load briefly drop sharply, and as a result, the desired boost pressure is reduced in the shifting times in accordance with the performance graph specification as well. The drop in the desired value specification in brief load changes, however, leads to major pollutant emissions and is therefore undesired.

One such system for the closed-loop control of the turbocharging of an internal combustion engine is described in U.S. Pat. No. 5,551,235 to Entenmann et al. (German Patent Disclosure DE 43 44 960).

SUMMARY OF THE INVENTION

It is accordingly an object of the invention to provide for desired value specification for the closed-loop control of the boost pressure of a turbocharged internal combustion engine, which overcomes the above-mentioned disadvantages of the heretofore-known devices and methods of this general type and which is improved with regard to dynamic considerations.

With the foregoing and other objects in view there is provided, in accordance with the invention, a method for the closed-loop control of a boost pressure of a turbocharged internal combustion engine, which comprises the following steps:

repeatedly determining a current performance graph value for a desired boost pressure in an internal combustion engine from a speed/load-dependent performance graph;

comparing the current performance graph value with a previous performance graph value;

if the current performance graph value is greater than or equal to the previous performance graph value:
transmitting the current performance graph value as a process parameter for a turbocharger of the internal combustion engine;

if the current performance graph value is less than the previous performance graph value:
retaining the previous performance graph value as the process parameter until a predetermined idle time elapses; and
after the idle time has elapsed, transmitting the current performance graph value as the process parameter.

In accordance with an added feature of the invention, the current performance graph value is filtered after the predetermined idle time has elapsed; and the filtered current performance graph value is forwarded as the process parameter.

In accordance with another feature of the invention, the filtering step comprises filtering the current performance graph value with a $PT_2$ filter.

In accordance with an additional feature of the invention, a new idle time cycle is started if the current performance graph value is greater than or equal to the previous performance graph value.

In accordance with a concomitant feature of the invention, a new idle time cycle is started each time after the predetermined idle time elapses.

In other words, the behavior of the engine is thus improved by dynamically correcting the values that are taken from the performance graph. If it is found that a performance graph value is greater than the performance graph value of the previous calculation, then the performance graph value is immediately transmitted as a process parameter, so that the corresponding desired boost pressure is transmitted as a specification to the actual controller of the boost pressure. If conversely the current performance graph value is less than the previous performance graph value, then the previous performance graph value is initially retained during an idle time or dead time. Once the idle time has elapsed, the current performance graph value is filtered and further processed as a process parameter in the boost pressure controller. A $PT_2$ filter has proved especially advantageous as the filter.

The method of the invention prevents an overly rapid drop in the desired boost pressure upon rapid load changes, thus reducing particle emissions and making possible higher exhaust gas recirculation rates during acceleration.

Other features which are considered as characteristic for the invention are set forth in the appended claims.

Although the invention is illustrated and described herein as embodied in a method for closed-loop regulation of the boost pressure of a turbocharged internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole Figure of the drawing is a flowchart illustrating the method of the invention.

DESCRIPTION OF THE PREFERRED EMBODIMENTS

In a regulatory period of the process outside the illustrated sequence, a performance graph value that corresponds to a desired boost pressure to be generated by a turbocharger is typically read out from a performance graph stored in memory. This is done on the basis of the speed or load values ascertained from the engine. At least two successive performance graph values u(k−1) and u(k) are stored in memory by the regulator.

In the applicable regulation cycle, in a step S1 the currently ascertained performance graph value u(k) is compared with the performance graph value u(k−1) determined in the previous cycle. On the basis of the comparison in step S1, the method branches to a step S2 if the current performance graph value u(k) is greater than or equal to the previous performance graph value u(k−1). Conversely, if the current performance graph value u(k) is less than the previous performance graph value u(k−1), the method branches to a query step S4.

In step S2, an idle time $T_t$ that runs in parallel in a non-illustrated idle time member, is restarted. In a subsequent step S3, the current performance graph value is transmitted as the process parameter x(k) and processed in a known manner by downstream portions of the boost pressure regulator. The branch of the method defined by steps S2 and S3 is therefore responsible both for static vehicle operation, with unchanged speed or load, and for dynamic vehicle operation where the speed or load increases. Upon each increase or maintenance of an unchanged performance graph value u(k), the corresponding idle time member of the regulator is triggered, causing the idle time $T_t$ to start over.

Conversely, if the speed and/or load of the engine drop (which may be caused, for instance, by a change in the accelerator pedal position associated with a shifting event) and correspondingly the current performance graph value u(k) is smaller than the previous performance graph value u(k−1), then the question is asked in step S4 whether the predetermined idle time $T_t$ has elapsed. A suitable value in practice for the idle time $T_t$ is between 1 and 3 seconds, but depending on the type of engine it may also be longer or shorter.

If it is determined in step S4 that the idle time $T_t$ has not yet elapsed, then the previous performance graph value u(k−1) is retained in a step S7 as the process parameter x(k) and transmitted to the regulator.

Conversely, if it is determined in step S4 that the idle time $T_t$ has elapsed, then the idle time $T_t$ is restarted in a step S5 by triggering the corresponding idle time member.

In a step S6 that follows step S5, the current performance graph value u(k) is filtered by a $PT_2$ member and transmitted as the process parameter x(k) to the regulator. The $PT_2$ member may be any suitable second-order delay element.

The idle time $T_t$ and the parameters of the $PT_2$ filter can be selected freely, depending on the kind of application.

Corresponding open-loop or closed-loop control that sets the idle time and filter parameters is also possible.

We claim:

1. A method for the closed-loop control of a boost pressure of a turbocharged internal combustion engine, which comprises the following steps:
   repeatedly determining a current performance graph value for a desired boost pressure in an internal combustion engine from a speed/load-dependent performance graph;
   comparing the current performance graph value with a previous performance graph value;
   if the current performance graph value is greater than or equal to the previous performance graph value:
      transmitting the current performance graph value as a process parameter for a turbocharger of the internal combustion engine;
   if the current performance graph value is less than the previous performance graph value:
      retaining the previous performance graph value as the process parameter until a predetermined idle time elapses; and
      after the idle time has elapsed, transmitting the current performance graph value as the process parameter.

2. The method according to claim 1, which comprises:
   filtering the current performance graph value after the predetermined idle time has elapsed; and
   transmitting the filtered current performance graph value as the process parameter.

3. The method according to claim 2, wherein the filtering step comprises filtering the current performance graph value with a $PT_2$ filter.

4. The method according to claim 1, which comprises starting a new idle time cycle if the current performance graph value is greater than or equal to the previous performance graph value.

5. The method according to claim 1, which comprises starting a new idle time cycle each time after the predetermined idle time elapses.

* * * * *